US011465732B2

(12) United States Patent
Tsai et al.

(10) Patent No.: US 11,465,732 B2
(45) Date of Patent: Oct. 11, 2022

(54) METHOD AND APPARATUS FOR CONTROLLING A DROOP PANEL

(71) Applicant: The Boeing Company, Chicago, IL (US)

(72) Inventors: Kevin Tsai, Seattle, WA (US); Lisa Schleuter, Everett, WA (US)

(73) Assignee: The Boeing Company, Chicago, IL (US)

( * ) Notice: Subject to any disclaimer, the term of this patent is extended or adjusted under 35 U.S.C. 154(b) by 855 days.

(21) Appl. No.: 15/987,092

(22) Filed: May 23, 2018

(65) Prior Publication Data

US 2019/0359314 A1 Nov. 28, 2019

(51) Int. Cl.
| | |
|---|---|
| *B64C 9/18* | (2006.01) |
| *B64C 3/50* | (2006.01) |
| *B64C 9/04* | (2006.01) |
| *B64C 9/14* | (2006.01) |

(52) U.S. Cl.
CPC .................. *B64C 9/18* (2013.01); *B64C 3/50* (2013.01); *B64C 9/04* (2013.01); *B64C 2009/143* (2013.01)

(58) Field of Classification Search
CPC .... B64C 3/44; B64C 3/48; B64C 3/50; B64C 9/04; B64C 9/16; B64C 9/18; B64C 9/22; B64C 9/24
See application file for complete search history.

(56) References Cited

U.S. PATENT DOCUMENTS

| | | | |
|---|---|---|---|
| 11,214,354 B2* | 1/2022 | Kuruvilla | ............... B64C 3/187 |
| 2010/0140414 A1* | 6/2010 | Beyer | ...................... B64C 9/24 |
| | | | 244/214 |
| 2013/0112814 A1 | 5/2013 | Yue | |
| 2014/0145039 A1 | 5/2014 | Beyer et al. | |
| 2014/0346282 A1* | 11/2014 | Aljets | ....................... B64C 9/10 |
| | | | 244/217 |
| 2019/0241250 A1* | 8/2019 | Hencke | ..................... B64C 9/18 |

* cited by examiner

*Primary Examiner* — Nicholas McFall
*Assistant Examiner* — Terri L Filosi
(74) *Attorney, Agent, or Firm* — Haynes and Boone, LLP

(57) ABSTRACT

A method and apparatus for positioning a control surface. An apparatus comprises an arm, first link, and second link. The arm has first and second ends, the first end of the arm rotatably coupled to a wing structure to define a first pivot point. The first link has first and second ends, the first end being rotatably coupled to the second end of the arm. The second link has first and second ends, the first end rotatably coupled to the first end of the arm. When the second end of the first link is rotatably coupled to a first control surface and the second end of the second link is rotatably coupled to a second control surface, movement of the first control surface away from the wing structure rotates the arm about the first pivot point such that the second control surface moves in coordination with the first control surface.

20 Claims, 15 Drawing Sheets

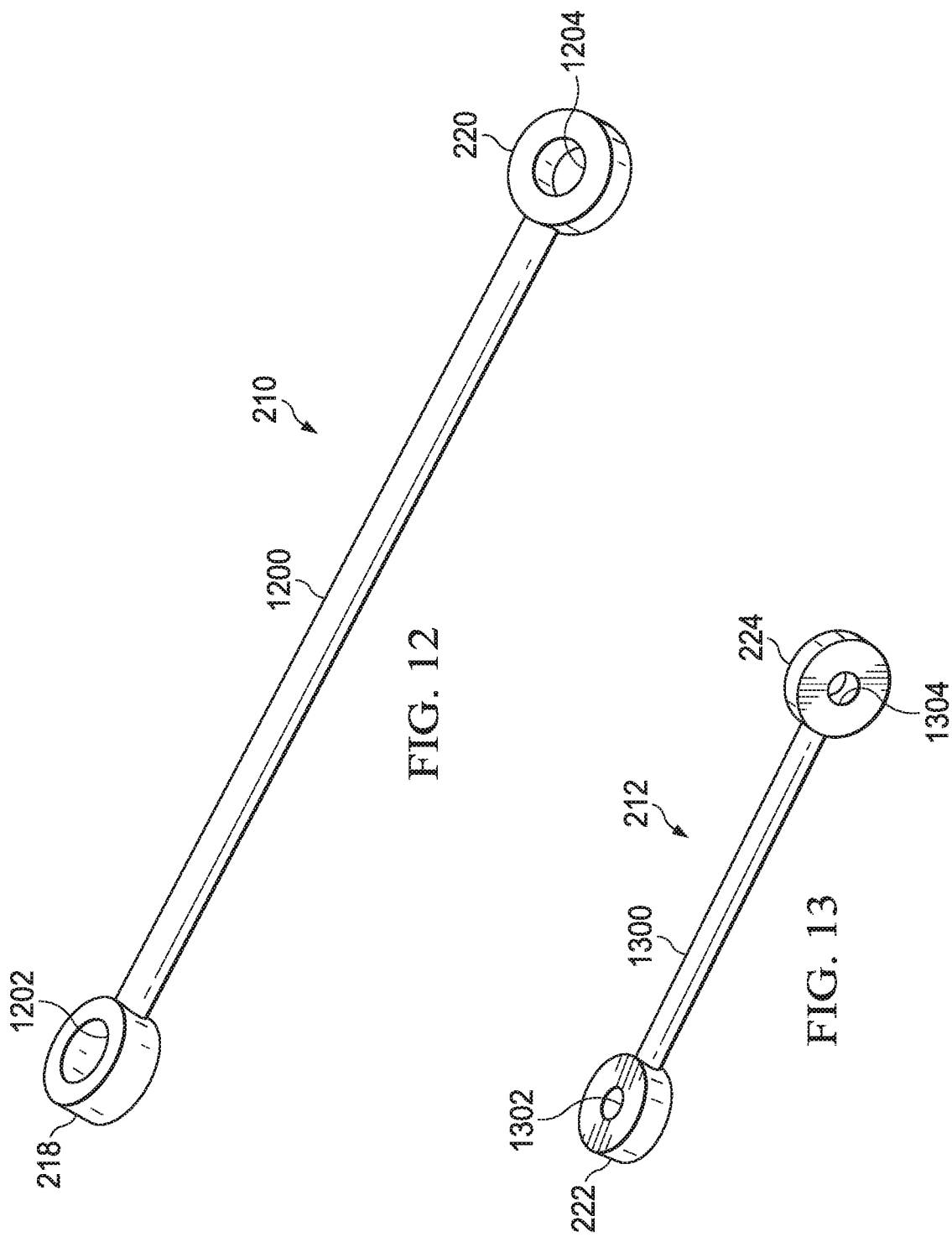

METHOD AND APPARATUS FOR CONTROLLING A DROOP PANEL

FIELD

The present disclosure relates generally to controlling flight control surfaces, and more particularly, to a method and apparatus for controlling the position of a droop panel relative to a flap of a wing of an aircraft during extension of the flap.

BACKGROUND

Flight control surfaces are used on aircraft to control the aerodynamic performance of the aircraft during flight. Flight control surfaces include, for example, leading edge devices and trailing edge devices. Different types of leading edge devices and trailing edge devices may be used to improve the airflow over a wing of an aircraft during flight. A flap is an example of one type of trailing edge device for a wing. Extending the flaps on a wing may increase the amount of lift that the wing can generate. More specifically, the flaps on a wing may be extended to increase the camber or curvature of the wing, thereby increasing the amount of lift that can be generated.

A droop panel is another type of edge device that may be used in coordination with a flap to improve the aerodynamic performance of a wing. For example, a droop panel may be used in coordination with a flap to allow a desired airflow over a wing. Some currently available mechanisms for moving a droop panel in coordination with a flap require more space and add more weight and complexity to the droop panel and/or flap than is desired. Further, some currently available mechanisms for controlling a droop panel may reduce overall wing performance.

As one example, the droop panel may be driven to move in coordination with the flap by a dedicated drive system. The drive system may be electrical, mechanical, electromechanical, hydraulic, or some other type of drive system. But using this type of drive system to control the droop panel may require more space and/or add more weight and complexity to the droop panel and flap than is desired. The size and configuration of the types of mechanisms used to control movement of the droop panel may complicate or prohibit their use with newer generation wings that have lower height profiles (e.g., thinner wings). Thinner wings may improve aerodynamic performance by, for example, improving lift while minimizing drag.

SUMMARY

In one example embodiment, an apparatus comprises an arm, a first link, and a second link. The arm has a first end and a second end, the first end of the arm rotatably coupled to a wing structure to define a first pivot point. The first link has a first end and a second end, the first end of the first link being rotatably coupled to the second end of the arm. The second link has a first end and a second end, the first end of the second link rotatably coupled to the first end of the arm. When the second end of the first link is rotatably coupled to a first control surface and the second end of the second link is rotatably coupled to a second control surface, movement of the first control surface away from the wing structure rotates the arm in a first direction about the first pivot point such that the second control surface moves in coordination with the first control surface.

In another example embodiment, an apparatus comprises an arm, a first link, and a second link. The arm has a first end and a second end, the first end of the arm rotatably coupled to a wing structure to define a first pivot point. The first link has a first end and a second end, the first end of the first link being rotatably coupled to the second end of the arm. The second link has a first end and a second end, the first end of the second link rotatably coupled to the first end of the arm. When the second end of the first link is rotatably coupled to a flap and the second end of the second link is rotatably coupled to a droop panel, movement of the flap away from the wing structure rotates the arm in a first direction about the first pivot point such that the droop panel moves in coordination with the flap such that the flap and the droop panel maintain a desired combined surface profile during extension of the flap.

In yet another example embodiment, a method for controlling control surfaces is provided. Responsive to movement of a first control surface away from a wing structure, a first link that is rotatably coupled to the first control surface and an arm is moved to thereby rotate the arm in a first direction. Responsive to rotation of the arm in the first direction, a second link that is coupled to the arm and a second control surface is moved to thereby move the second control surface in coordination with the first control surface.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

The novel features believed characteristic of the example embodiments are set forth in the appended claims. The example embodiments, however, as well as a preferred mode of use, further objectives and features thereof, will best be understood by reference to the following detailed description of an example embodiment of the present disclosure when read in conjunction with the accompanying drawings, wherein:

FIG. 12 is an illustration of an isometric view of a first link of a bell-crank system in accordance with an example embodiment.

FIG. 13 is an illustration of an isometric view of a second link of a bell-crank system in accordance with an example embodiment.

DETAILED DESCRIPTION

The example embodiments described below provide various methods and related apparatuses for controlling a control surface such as, for example, a droop panel. In particular, the example embodiments provide a coupling and positioning system for positioning a droop panel in coordination with extension of a flap without requiring more space than desired and without adding more weight or complexity to the droop panel and flap than desired.

For example, this coupling and positioning uses three-dimensional kinematics to ensure that the droop panel moves in coordination with the extension of a flap without requiring that a height of the wing be greater than desired. Further, this type of mechanism may be used to control the droop panel without requiring a separate, dedicated drive system. The movement of the flap controls the movement of the droop panel, thereby protecting the flap from unintended contact with the droop panel.

Further, this coupling and positioning system may have a substantially horizontal orientation relative to the wing, which allows the coupling and positioning system to fit comfortably within a wing of reduced height, while still allowing a desired range of motion. These thinner wings may provide greater aerodynamic performance, especially during high-speed conditions, such as cruising.

The coupling and positioning system also allows a large reduction in motion from the flap to the droop panel. In other words, using this system reduces the motion of the droop panel needed for the droop panel to move in coordination with the flap in the desired manner, even with large angular displacements of the flap. Being able to provide a large angular displacement of the flap, as well as a large translation of the flap away from the wing (e.g., aftward translation or fowler motion), may improve aerodynamic performance of the aircraft, especially during low-speed flight conditions, such as takeoff and landing.

Further, the coupling and positioning system described by the example embodiments, which may be implemented as a bell-crank system, may allow for greater flexibility in adjusting for motion and loads to provide the overall desired wing performance. The substantially horizontal orientation of the coupling and positioning system allows the droop panel to be customized based on flap motion and speed.

Figure 1:
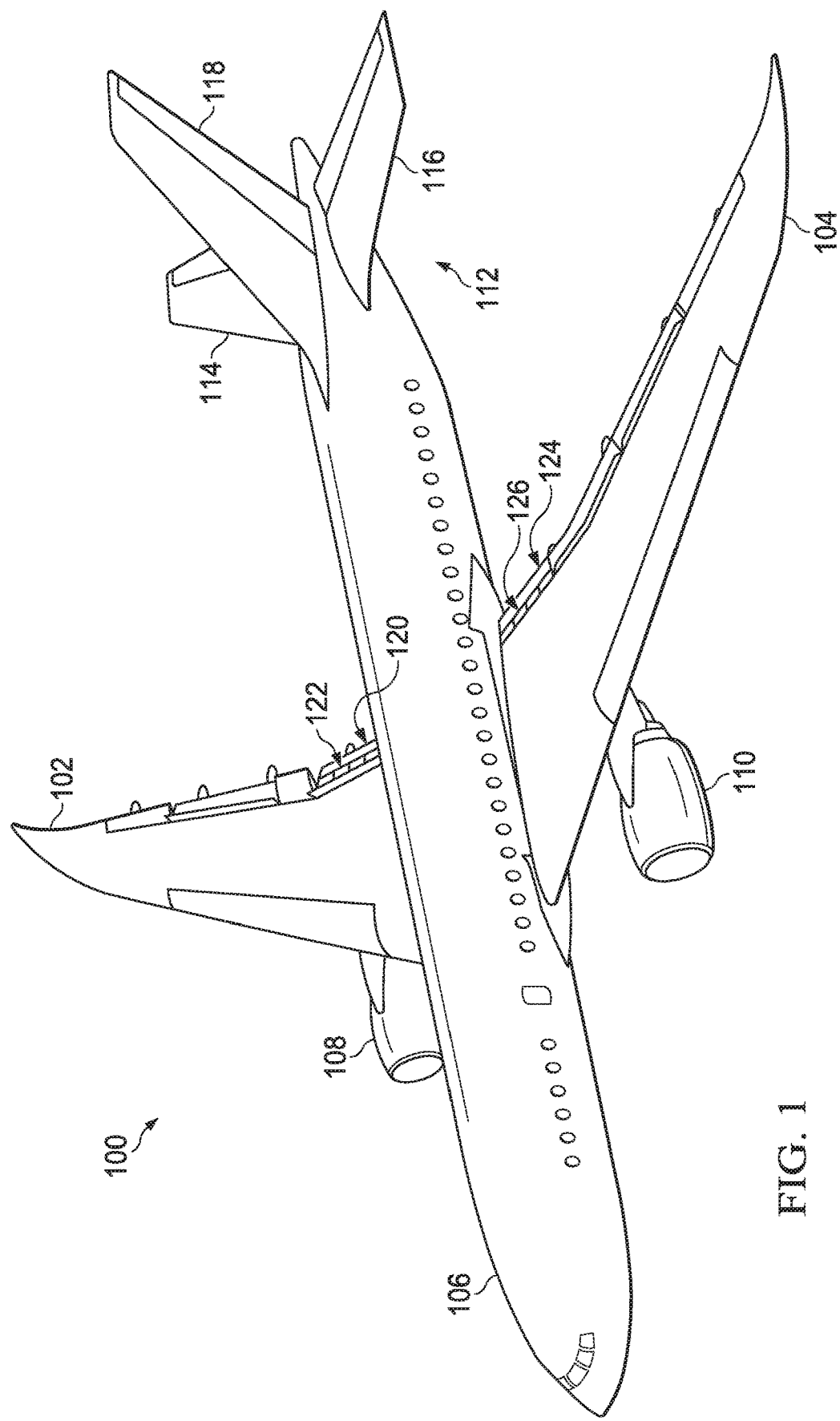
FIG. 1 is an illustration of a perspective view of an aircraft in accordance with an example embodiment.

With reference now to the figures, FIG. 1 is an illustration of an aircraft 100 in accordance with an example embodiment. Aircraft 100 includes wing 102, wing 104, and fuselage 106. Engine system 108 is attached to wing 102 and engine system 110 is attached to wing 104. Aircraft 100 further includes tail section 112, which includes horizontal stabilizer 114, horizontal stabilizer 116, and vertical stabilizer 118.

Wing 102 includes first control surface(s) 120 and second control surface(s) 122. Wing 104 includes first control surface(s) 124 and second control surface(s) 126. These different control surfaces help provide the desired aerodynamic performance during flight. In these illustrative examples, first control surface 120 and first control surface 124 take the form of flaps, while second control surface 122 and second control surface 126 take the form of droop panels.

First control surface 120 and second control surface 122 may be coupled using a coupling and positioning system such as, for example, bell-crank system 200 described below in FIG. 2, such that second control surface 122 moves in coordination with first control surface 120. First control surface 124 and second control surface 126 may also be coupled using a coupling and positioning system such as, for example, bell-crank system 200, such that second control surface 126 moves in coordination with first control surfaces 124.

In some illustrative examples, one or more of second control surfaces 126 may be coupled to a same one of first control surfaces 124. Similarly, one or more of second control surfaces 122 may be coupled to a same one of first control surfaces 120. In still other illustrative examples, one or more of first control surfaces 124 may be coupled to a same one of second control surfaces 126. Similarly, one or more of first control surfaces 120 may be coupled to a same one of first control surfaces 122.

Figure 2:
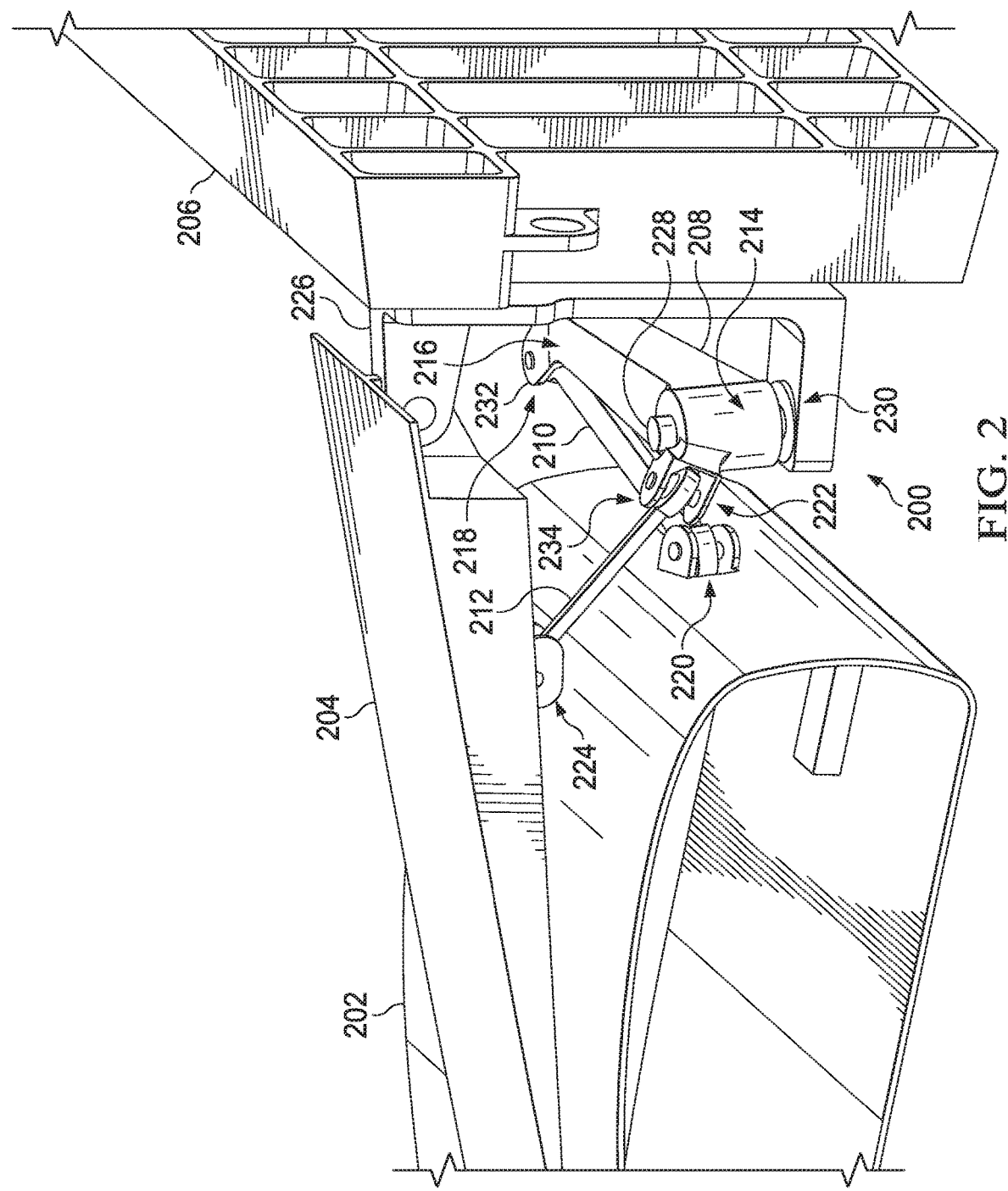
FIG. 2 is an illustration of a perspective view of a bell-crank system in accordance with an example embodiment.

With reference now to FIG. 2, an illustration of a perspective view of a bell-crank system is depicted in accordance with an example embodiment. In this example embodiment, bell-crank system 200 is coupled to flap 202, droop panel 204, and wing structure 206. Flap 202 may be an example of one implementation for first control surface 120 or first control surface 124 in FIG. 1. Droop panel 204 may be an example of one implementation for second control surface 122 or second control surface 126 in FIG. 1. In one illustrative example, droop panel 204 is an inboard droop panel. In other illustrative examples, two different types of control surfaces other than flap 202 and droop panel 204 may be used with bell-crank system 200.

Wing structure 206 may be, for example, a structure within wing 102 or wing 104 in FIG. 1. Wing structure 206 may take the form of a beam, a stabilizer, a frame, or some other type of structural.

As depicted, bell-crank system 200 includes arm 208, first link 210, and second link 212. First link 210 couples arm 208 to flap 202, while second link 212 couples arm 208 to droop panel 204. Accordingly, in some example embodiments, first link 210 and second link 212 may be referred to as a flap link and a droop link, respectively. Arm 208 extends between first end 214 and second end 216 of arm 208. First link 210 extends between first end 218 and second end 220 of first link 210. Second link 212 extends between first end 222 and second end 224 of second link 212.

First link 210 and second link 212 are both rotatably coupled to arm 208. A first component, such as first link 210 or second link 212, may be rotatably coupled to a second component, such as arm 208, by being rotatable relative to the second component with at least two degrees of rotational freedom.

As depicted, first end 214 of arm 208 is rotatably coupled to wing structure 206. In this illustrative example, first end 214 of arm 208 is rotatably coupled to wing structure 206 through fitting 226. Fitting 226 may be, for example, without limitation, a support bracket that is attached to wing structure 206. Further, fitting 226 is also attached to droop panel 204. Member 228 is used to couple first end 214 of arm 208 to fitting 226, which thereby couples first end 214 of arm 208 to wing structure 206. The coupling of first end 214 of arm 208 to wing structure 206 through fitting 226 defines pivot point 230, which may be a first pivot point.

First end 218 of first link 210 is rotatably coupled to second end 216 of arm 208. The coupling of first end 218 of first link 210 to second end 216 of arm 208 defines pivot point 232, which may be a second pivot point. Second end 220 of first link 210 is rotatably coupled to flap 202. First end 222 of second link 212 is rotatably coupled to first end 214 of arm 208. The coupling of first end 222 of second link 212 to first end 214 of arm 208 defines pivot point 234, which may be a third pivot point. Second end 224 of second link 212 is rotatably coupled to droop panel 204.

In these illustrative examples, the various couplings described above may be implemented using joints having at least two degrees of rotational freedom. For example, first end 222 of second link 212 may be rotatably coupled to first end 214 of arm 208 using a joint having at least two degrees of rotational freedom. First end 218 of first link 210 may be rotatably coupled to second end 216 of arm 208 using a joint having at least two degrees of rotational freedom. Second end 224 of second link 212 may be rotatably coupled to droop panel 204 using a joint having at least two degrees of rotational freedom. Second end 220 of first link 210 may be rotatably coupled to flap 202 using a joint having at least two degrees of rotational freedom. In some illustrative examples, each joint may be implemented using, for example, at least one of a spherical bearing, a universal joint, or some other type of bearing or joint or combination of bearings or joints As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and five of item C; three of item B and six of item C; or some other suitable combination.

In these illustrative examples, bell-crank system 200 is positioned substantially horizontally relative to flap 202. In this manner, bell-crank system 200 may be positioned substantially horizontally (or spanwise) relative to the wing with which wing structure 206 is associated. This substantially horizontal positioning of bell-crank system 200 may allow bell-crank system 200 to be used with wings having reduced height profiles (e.g. thinner wings). The thinner wings may provide improved lift while minimizing drag. In some illustrative examples, bell-crank system 200 may be referred to as a horizontal bell-crank system. In other illustrative examples, bell-crank system 200 may be referred to as a spanwise bell-crank system.

Further, first link 210 may have a first length, second link 212 may have a second length, and arm 208 may have a third length. Each of these lengths may be selected using kinematics based on the movement of flap 202 and a desired combined surface profile for flap 202 and droop panel 204 that is to be maintained during extension of flap 202.

When flap 202 is moved away from the wing structure 206, this movement may cause arm 208 to rotate in a first direction about pivot point 230 such that droop panel 204 moves in coordination with flap 202. More specifically, when flap 202 is extended, first link 210 moves with flap 202, thereby causing arm 208 to rotate about pivot point 230. This rotation of arm 208 causes a corresponding movement of second link 212, which thereby moves droop panel 204 in coordination with flap 202. In this manner, droop panel 204 is slaved to flap 202.

Thus, bell-crank system 200 may operate using a type of "folding" mechanism. For example, bell-crank system 200 may "fold" and "unfold" substantially along a three-dimensional plane. This three-dimensional plane may be configured for the optimal movement of droop panel 204 relative to flap 202 based on at least one of systems integration, loading, or flap motion. The substantially horizontal positioning of bell-crank system 200 and the "folding" mechanism employed by bell-crank system 200 may allow bell-crank system 200 to be used with wings that have a reduced height profile.

Figure 3:
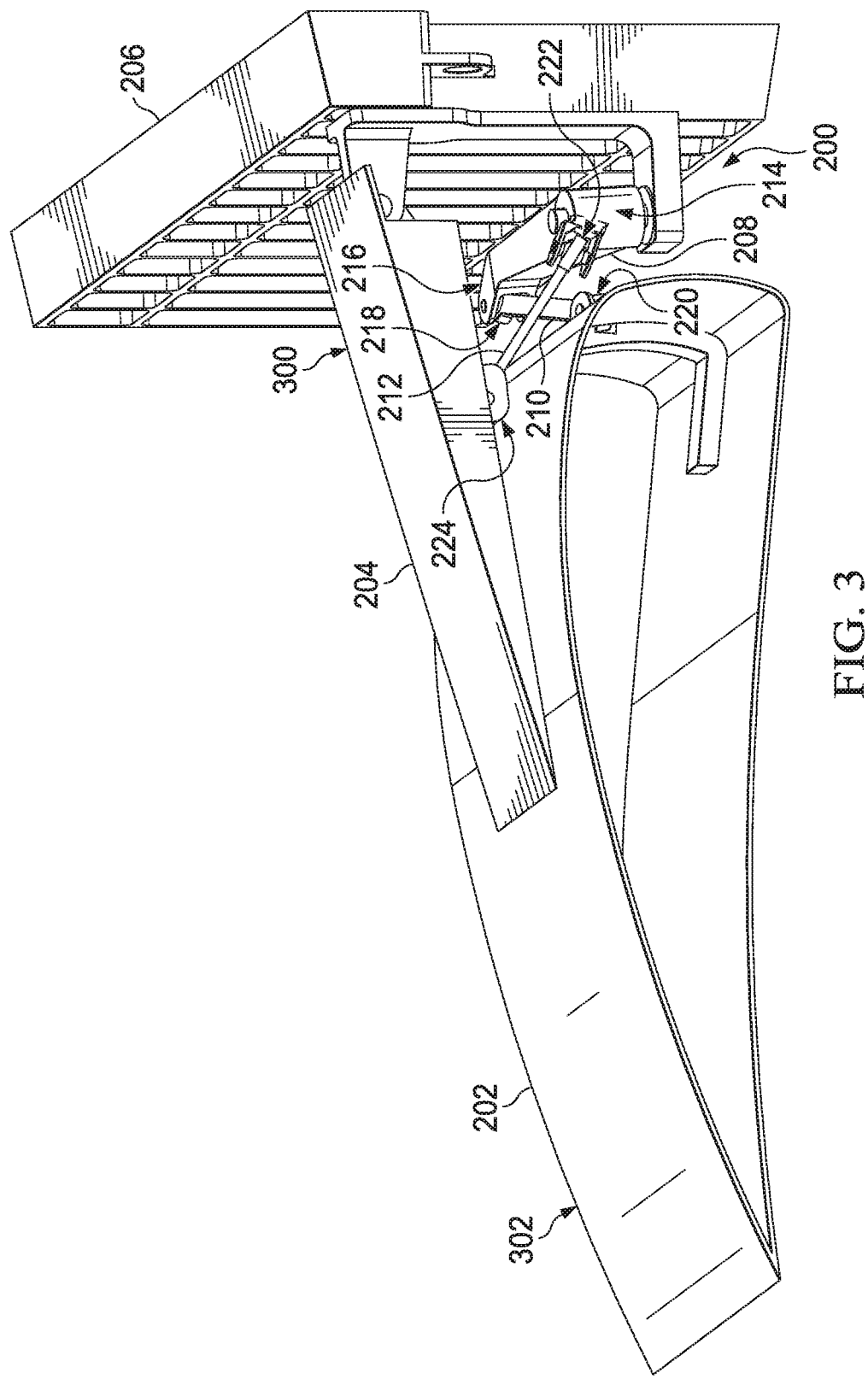
FIG. 3 is an illustration of a perspective view of the bell-crank system, the flap, the droop panel, and the wing structure from FIG. 2 in accordance with an example embodiment.

Turning now to FIGS. 3-6, illustrations of a perspective view of the movement of droop panel 204 in coordination with flap 202 are depicted in accordance with an example embodiment. In FIG. 3, an illustration of a perspective view of bell-crank system 200, flap 202, droop panel 204, and wing structure 206 is depicted in accordance with an example embodiment. Flap 202 has outer surface 300 and droop panel 204 has outer surface 302. Flap 202 is not extended in this illustrative example. Flap 202 is in a stowed (or undeployed) position. With flap 202 in this stowed position, any gap between outer surface 300 of flap 202 and outer surface 302 of droop panel 204 may be minimal, if present at all.

Figure 4:
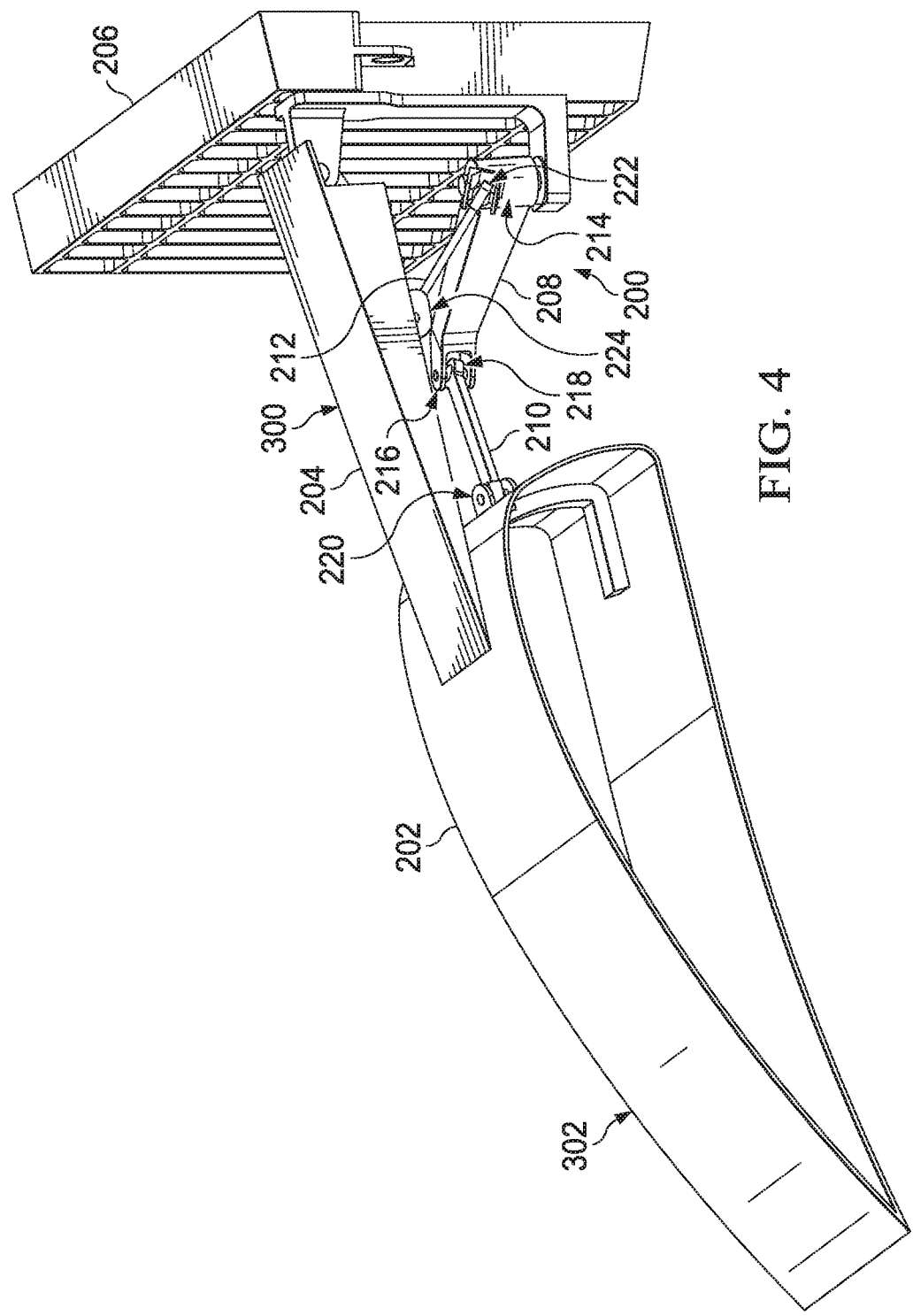
FIG. 4 is an illustration of a perspective view of a flap that is partially extended in accordance with an example embodiment.

With reference now to FIG. 4, flap 202 has been partially extended. This extension of flap 202 has caused first link 210 to move with flap 202, arm 208 to be rotated, second link 212 to be moved in response to the rotation of arm 208, and droop panel 204 to be moved by the movement of second link 212. Thus, bell-crank system 200 allows droop panel 204 to be moved in coordination with flap 202 during the extension of flap 202. As flap 202 extends, bell-crank system 200 unfolds to thereby move droop panel 204 in coordination with flap 202.

Accordingly, flap 202 and droop panel 204 may maintain a desired combined surface profile during extension of flap 202. This desired combined profile may be the profile created by both outer surface 300 of flap 202 and outer surface 302 of droop panel 204.

Further, the movement of droop panel 204 in coordination with flap 202 may control a gap between outer surface 302 of droop panel 204 and outer surface 300 of flap 202. As one illustrative example, moving droop panel 204 in coordination with flap 202 may ensure that any gap between outer surface 302 of droop panel 204 and outer surface 300 of flap 202 is maintained or reduced to control the airflow over flap 202 and droop panel 204. Thus, controlling this gap may help control the performance of the wing with which wing structure 206, flap 202, and droop panel 204 are associated.

Figure 5:
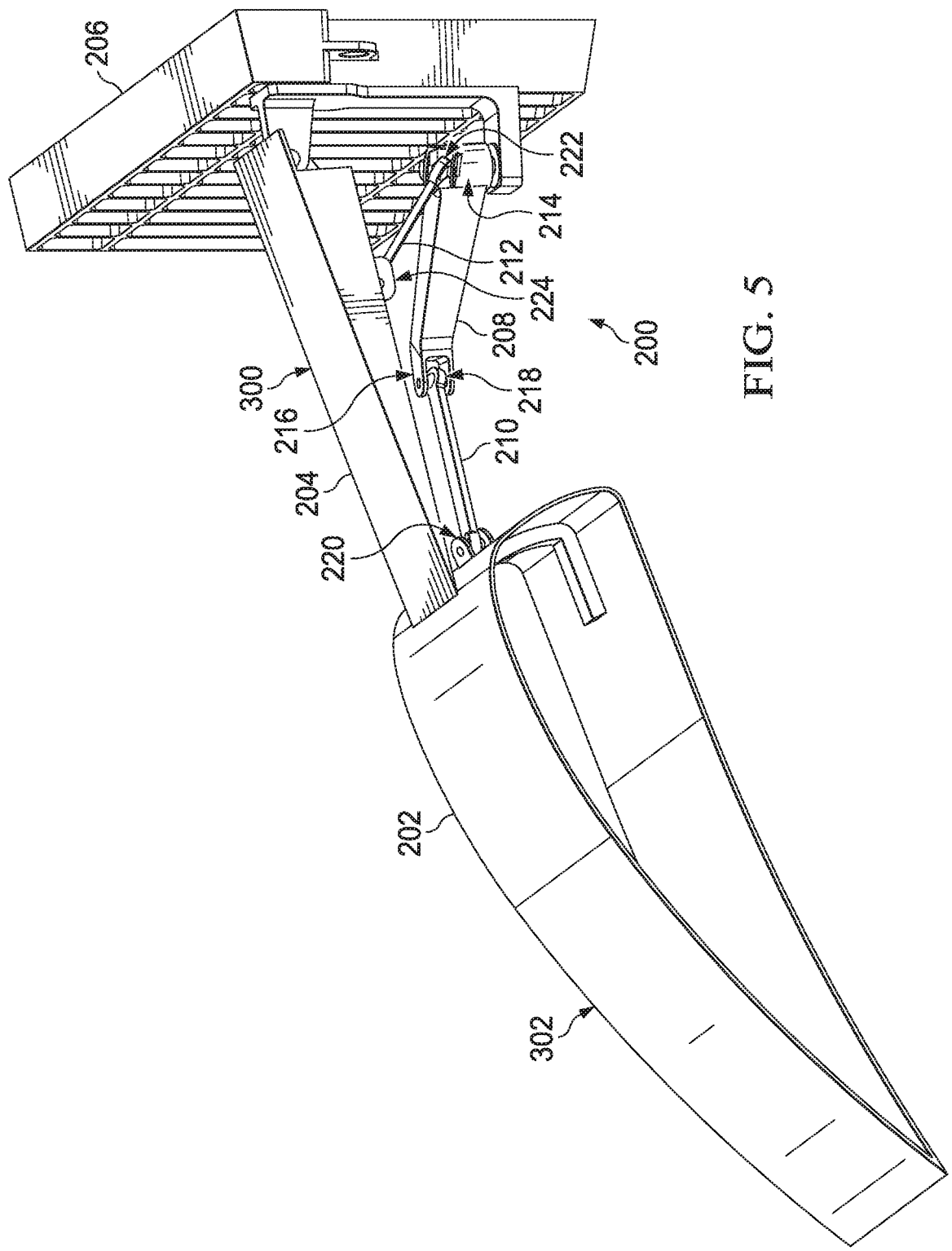
FIG. 5 is an illustration of a perspective view of a flap that is further extended in accordance with an example embodiment.

With reference now to FIG. 5, flap 202 has been further extended. Droop panel 204 has been moved in coordination with flap 202 to control the gap between outer surface 302 of droop panel 204 and outer surface 300 of flap 202. Droop panel 204 has been moved in coordination with flap 202 to improve airflow over flap 202 and droop panel 204, thereby improving aerodynamic performance. Further, movement of droop panel 204 in coordination with flap 202 helps maintain a desired combined surface profile during extension of flap 202.

Figure 6:
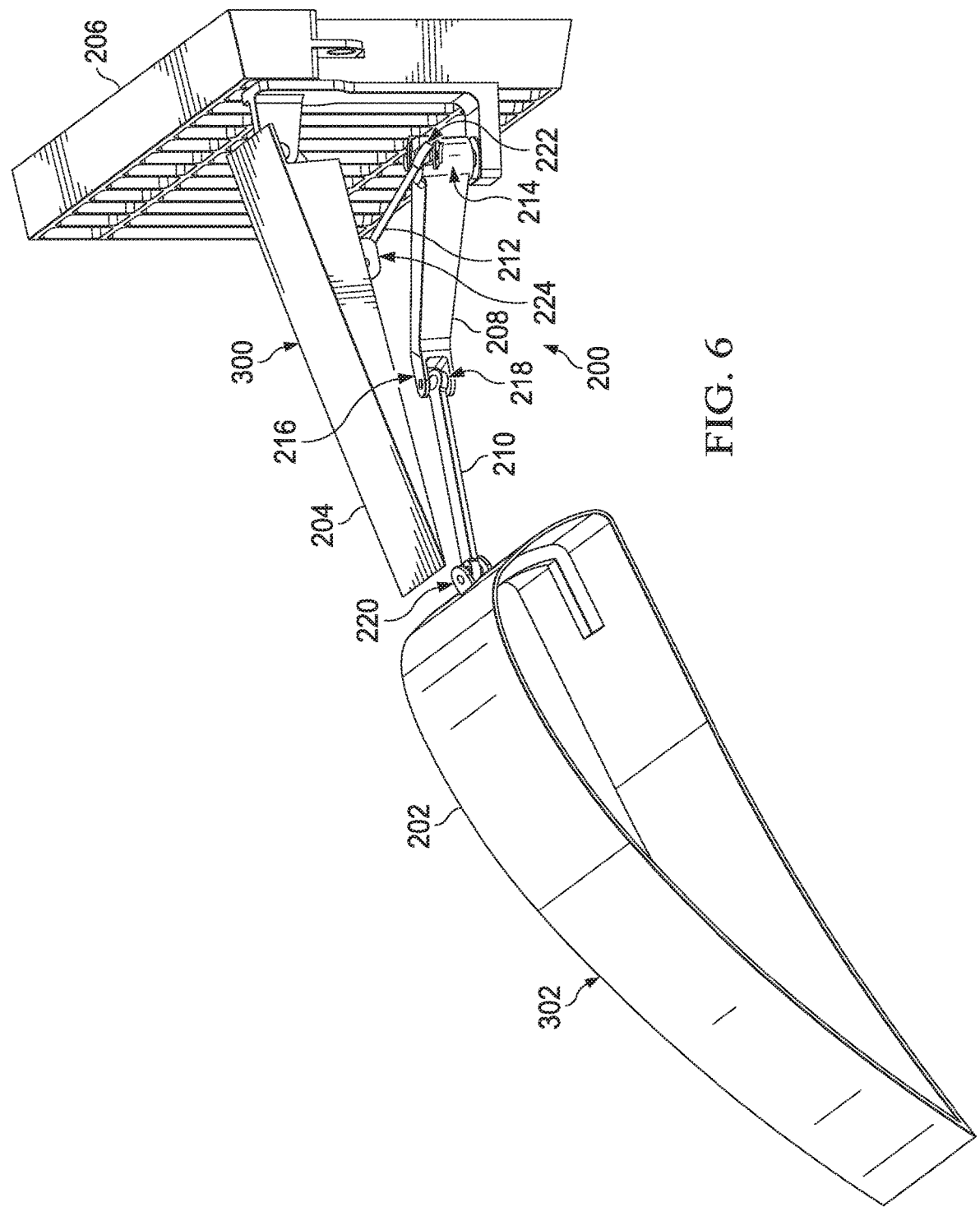
FIG. 6 is an illustration of a perspective view of a flap that is fully extended in accordance with an example embodiment.

With reference now to FIG. 6, flap 202 has been fully extended. Accordingly, bell-crank system 200 has been fully extended such that droop panel 204 has also been moved and positioned in coordination with flap 202. The movement of droop panel 204 in coordination with flap 202, as shown over FIGS. 4-6, helps maintain a desired combined surface profile for flap 202 and droop panel 204 throughout the extension of flap 202.

Figure 7:
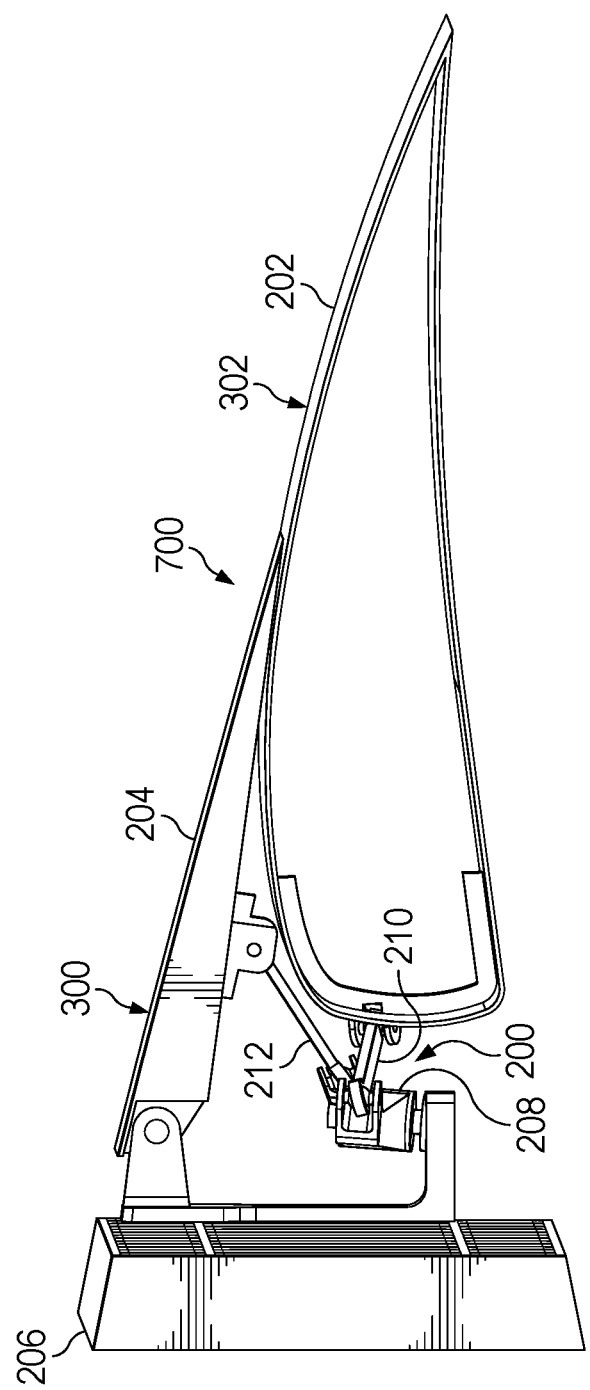
FIG. 7 is an illustration of a side view of a flap in a stowed position in accordance with an example embodiment.

Turning now to FIGS. 7-10, illustrations of a side view of the movement of droop panel 204 in coordination with flap 202 are depicted in accordance with an example embodiment. In FIG. 7, flap 202 is in a stowed position, similar to FIG. 3. Outer surface 300 of flap 202 and outer surface 302 of droop panel 204 form combined surface profile 700.

Figure 8:
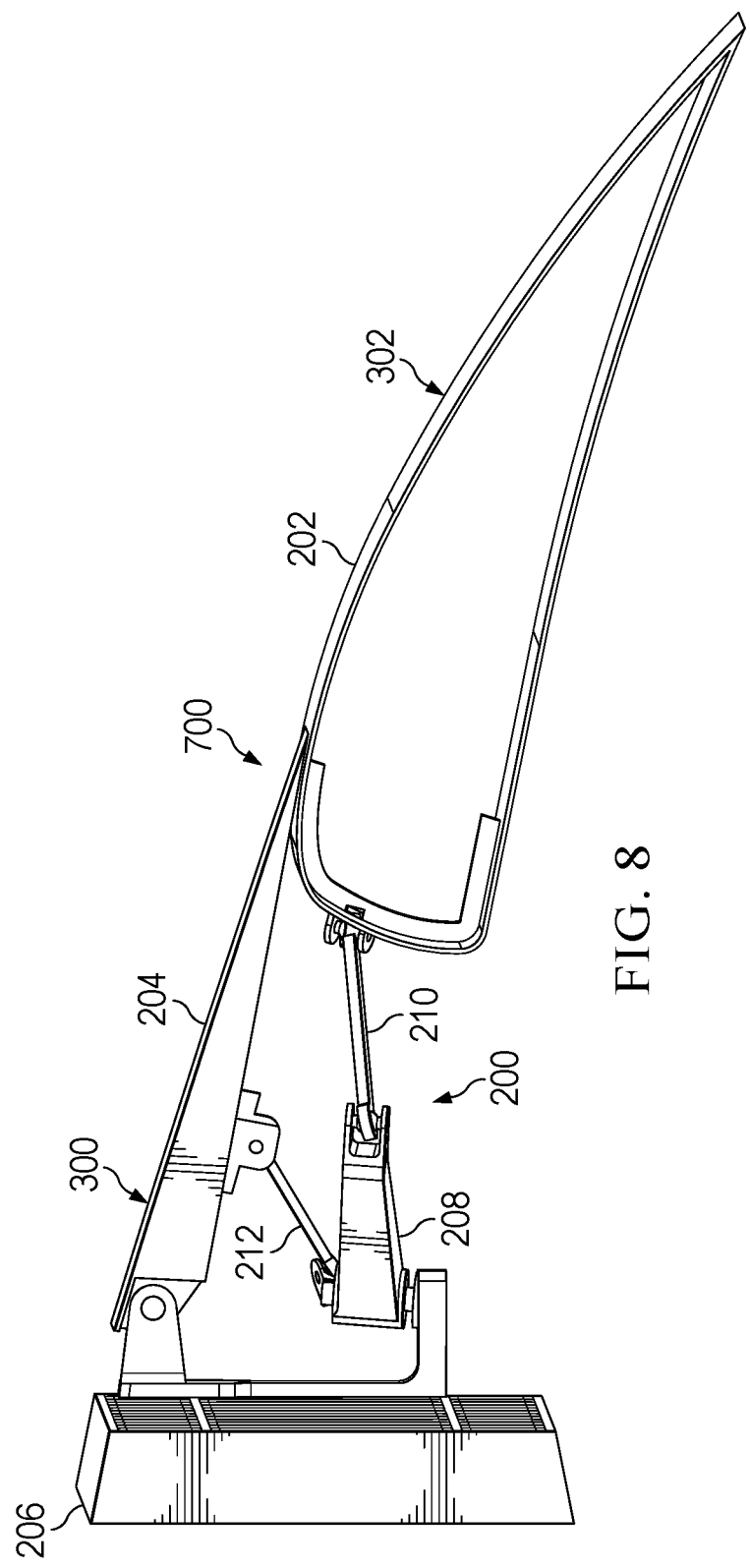
FIG. 8 is an illustration of a side view of a flap that is partially extended in accordance with an example embodiment.

In FIG. 8, flap 202 has been partially extended, similar to the partial extension of flap 202 in FIG. 4. The extension of flap 202 operates bell-crank system 200, causing droop panel 204 to move in coordination with flap 202. The movement of droop panel 204 in coordination with flap 202 ensures that combined surface profile 700 is a desired combined surface profile.

Figure 9:
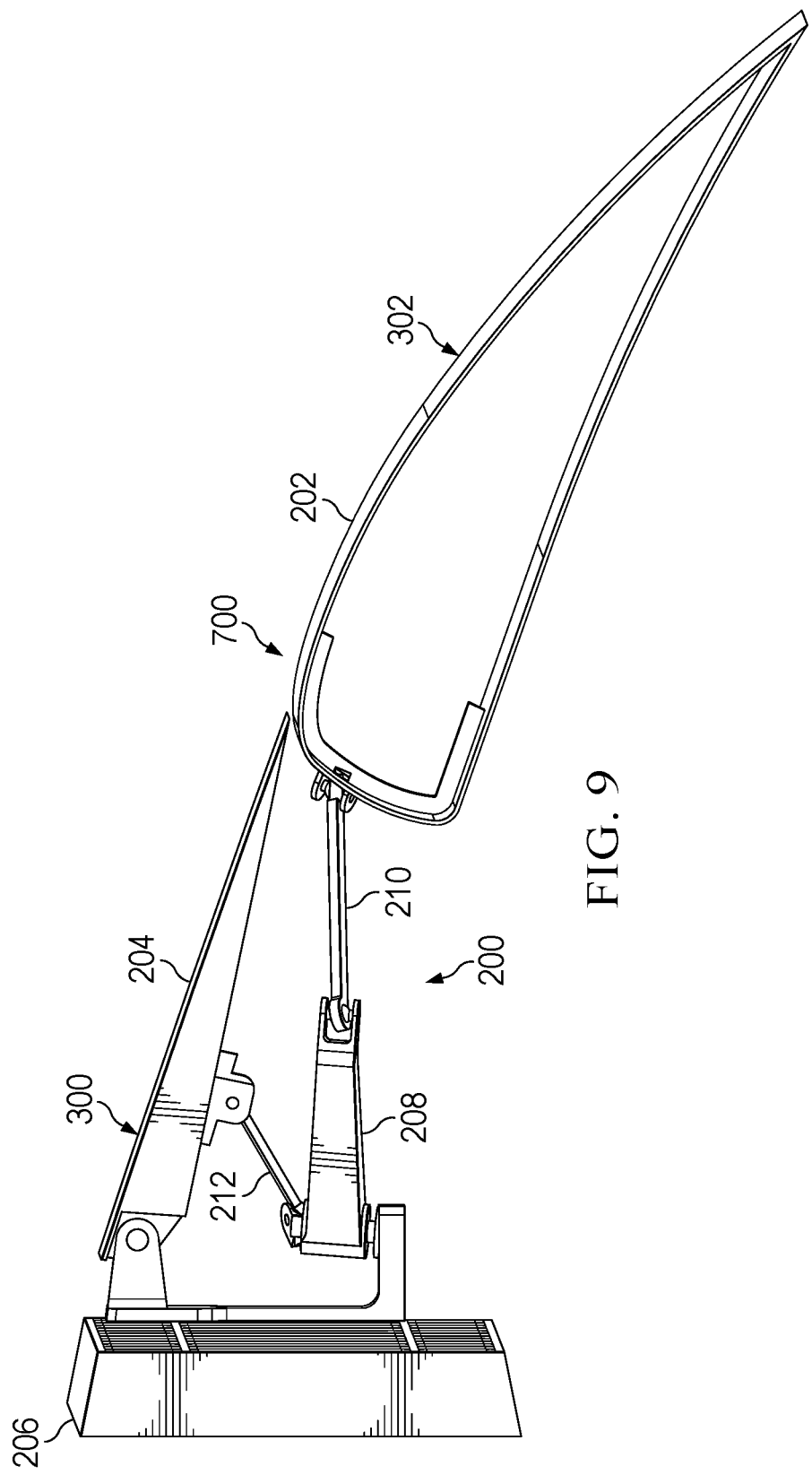
FIG. 9 is an illustration of a side view of a flap that is further extended in accordance with an example embodiment.

In FIG. 9, flap 202 has been further extended, similar to the extension of flap 202 in FIG. 5. The further extension of flap 202 further operates bell-crank system 200, causing droop panel 204 to continue to move in coordination with flap 202. In this illustrative example, combined surface profile 700 is created by both outer surface 300 of flap 202 and outer surface 302 of droop panel 204, as well as any gap between these two outer surfaces. This gap is controlled to ensure that combined surface profile 700 is a desired combined surface profile.

Figure 10:
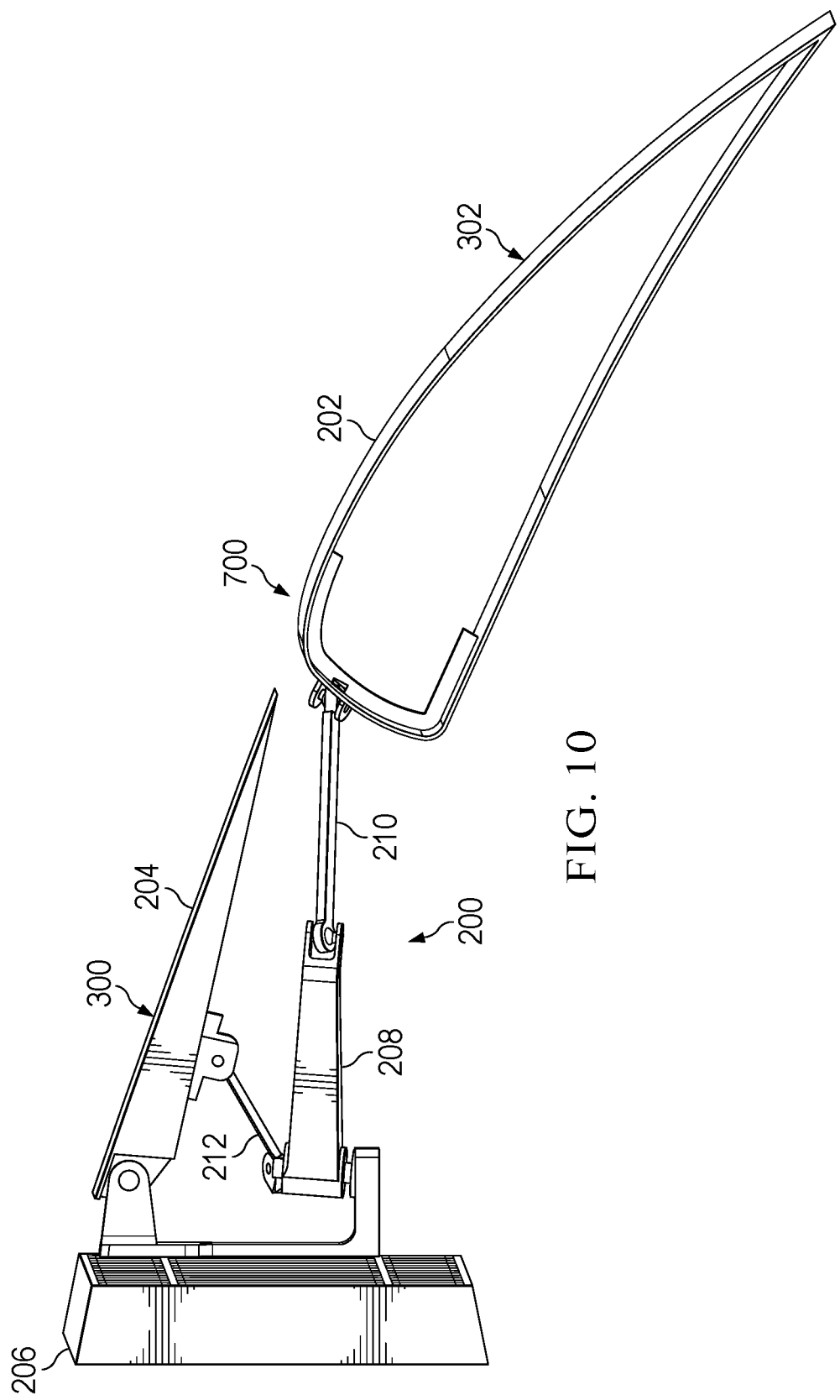
FIG. 10 is an illustration of a side view of a flap that is fully extended in accordance with an example embodiment.

In FIG. 10, flap 202 has been fully extended, similar to the extension of flap 202 in FIG. 6. The full extension of flap 202 further operates bell-crank system 200, causing droop panel 204 to continue to move in coordination with flap 202. In this illustrative example, combined surface profile 700 is created by both outer surface 300 of flap 202 and outer surface 302 of droop panel 204, as well as the gap between these two outer surfaces. This gap is controlled to ensure that combined surface profile 700 is a desired combined surface profile.

Figure 11:
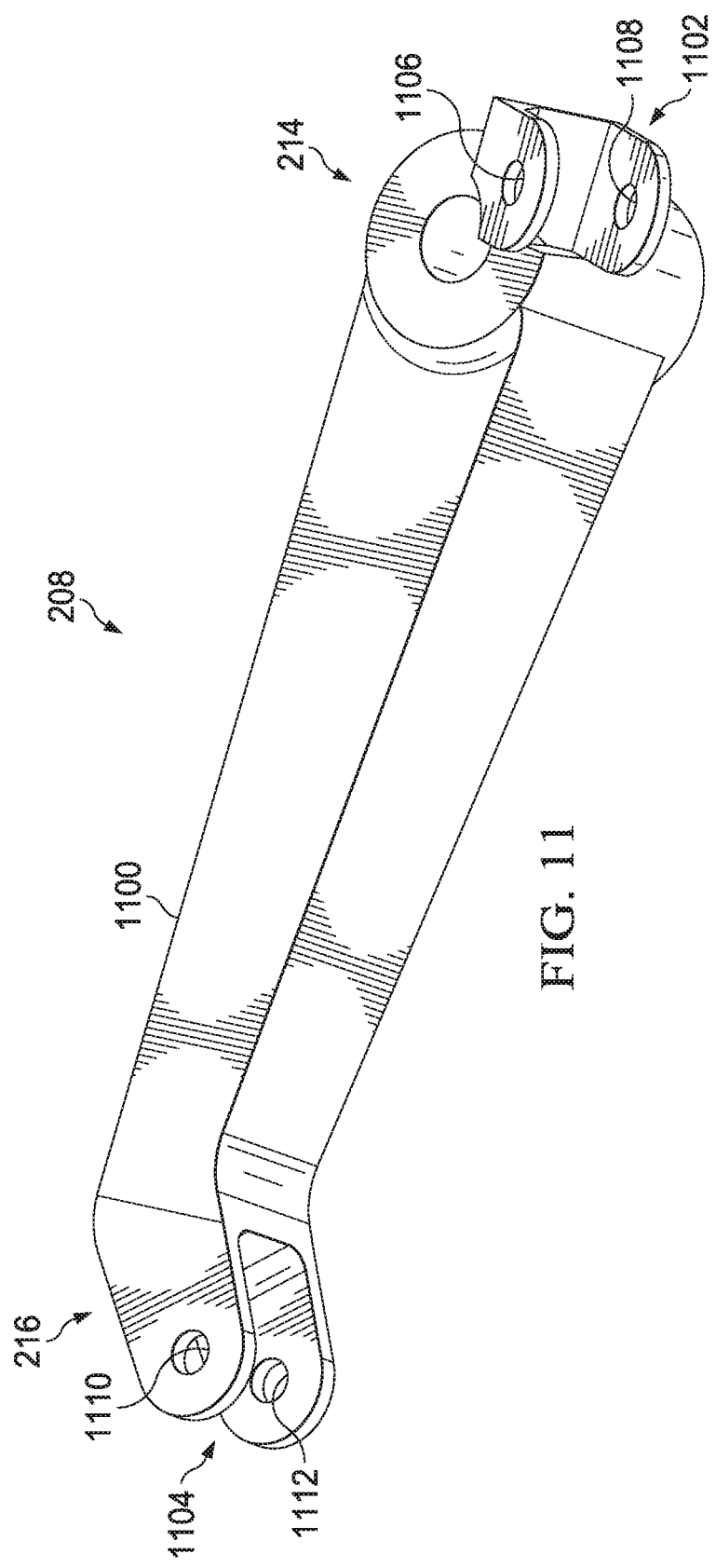
FIG. 11 is an illustration of an isometric view of an arm of a bell-crank system in accordance with an example embodiment.

With reference now to FIG. 11, an illustration of an isometric view of arm 208 is depicted in accordance with an example embodiment. As depicted, arm 208 includes body 1100 that extends between first end 214 and second end 216 of arm 208. Arm 208 also includes coupling portion 1102 at first end 214 and coupling portion 1104 at second end 216. Coupling portion 1102 is used to rotatably couple first end 214 of arm 208 to first link 210 in FIGS. 2-10. Coupling portion 1104 is used to rotatably couples second end 216 of arm 208 to second link 212 in FIGS. 2-10.

Coupling portion 1102 includes opening 1106 and opening 1108, which may receive a member, such as a pin or other type of fastener. Coupling portion 1104 includes opening 1110 and opening 1112, which may receive another member, such as a pin or other type of fastener. Coupling portion 1102 and coupling portion 1104 may be used to form joints that have at least two degrees of rotational freedom.

In this illustrative example, coupling portion 1102 and coupling portion 1104 are angled relative to body 1100. In particular, coupling portion 1102 is angled away from body 1100 in a first direction. Coupling portion 1104 is angled away from body 1100 in a second direction that is different from the first direction. In other words, coupling portion 1102 and coupling portion 1104 are at different angles or orientations relative to body 1100.

With reference now to FIG. 12, an illustration of an isometric view of first link 210 is depicted in accordance with an example embodiment. First link 210 includes body 1200 that extends between first end 218 and second end 220 of first link 210. First link 210 also includes coupling portion 1202 at first end 218 and coupling portion 1204 at second end 220. In this illustrative example, coupling portion 1202 and coupling portion 1204 are positioned at different angles or orientations relative to body 1200.

Coupling portion 1202 is used to rotatably couple first link 210 to arm 208, shown in FIGS. 2-11. Coupling portion 1204 is used to rotatably couple first link 210 to flap 202 shown in FIGS. 2-10. Thus, first link 210 couples flap 202 to arm 208. In some illustrative examples, coupling portion 1202 and coupling portion 1204 may each be implemented using a universal joint having at least two degrees of rotational freedom. In one illustrative example, coupling portion 1202 and coupling portion 1204 may each be implemented as a spherical bearing.

With reference now to FIG. 13, an illustration of an isometric view of second link 212 is depicted in accordance with an example embodiment. Second link 212 includes body 1300 that extends between first end 222 and second end 224 of second link 212. Second link 212 also includes coupling portion 1302 at first end 222 and coupling portion 1304 at second end 224. In this illustrative example, coupling portion 1302 and coupling portion 1304 are positioned at different angles or orientations relative to body 1300.

Coupling portion 1302 is used to rotatably couple second link 212 to arm 208, shown in FIGS. 2-11. Coupling portion 1304 is used to rotatably couple second link 212 to droop panel 204 shown in FIGS. 2-10. Thus, second link 212 couples droop panel 204 to arm 208. In some illustrative examples, coupling portion 1302 and coupling portion 1304 may each be implemented using a universal joint having at least two degrees of rotational freedom. In one illustrative example, coupling portion 1202 and coupling portion 1204 may each be implemented as a spherical bearing.

Figure 14:
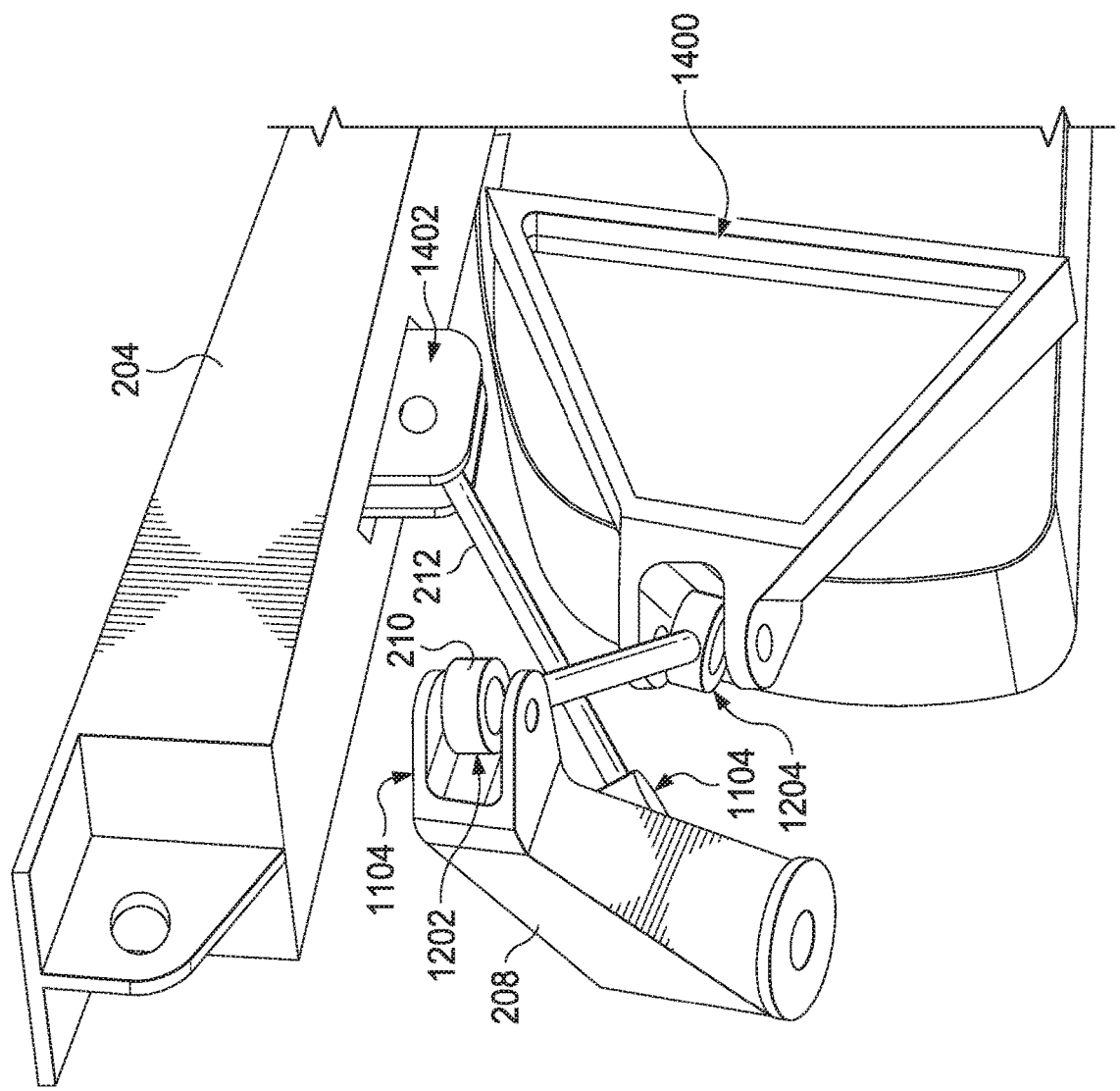
FIG. 14 is an illustration of another perspective view of a bell-crank system coupled to a flap and a droop panel in accordance with an example embodiment.

Turning now to FIG. 14, an illustration of another perspective view of bell-crank system 200 coupled to flap 202 and droop panel 204 is depicted in accordance with an example embodiment. Fitting 1400 is coupled with flap 202. First link 210 is connected to flap 202 through fitting 1400. Coupling portion 1204 of first link 210 and fitting 1400 together form a joint that provides at least two degrees of rotational freedom. Fitting 1402 is coupled with droop panel 204. Second link 212 is connected to droop panel 204 through fitting 1402. Coupling portion 1304 and fitting 1402 together form a joint that provides at least two degrees of rotational freedom.

Figure 15:
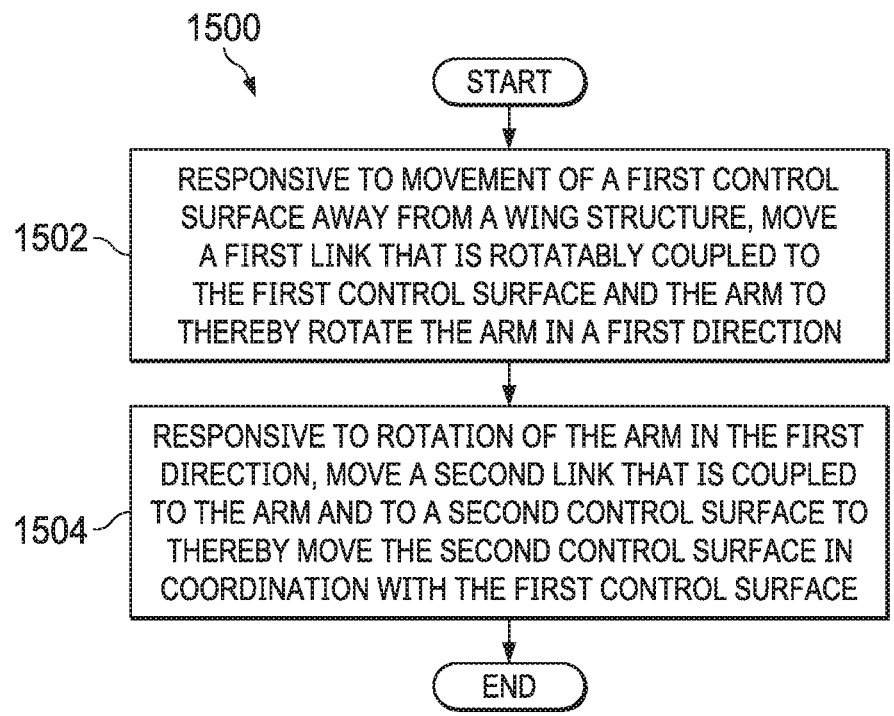
FIG. 15 is a flowchart of a process for controlling the movement of a control surface in accordance with an example embodiment.

With reference now to FIG. 15, a flowchart of a process for controlling the movement of a control surface is depicted in accordance with an example embodiment. Process 1500 illustrated in FIG. 15 may be implemented using a coupling and positioning system. For example, process 1500 may be implemented using bell-crank system 200 described in FIGS. 2-14.

Process 1500 may begin by, responsive to movement of a first control surface away from a wing structure, moving a first link that is rotatably coupled to the first control surface and an arm to thereby rotate the arm in a first direction (operation 1502). The first control surface may be, for example, flap 202 in FIGS. 2-10. Movement of the first control surface away from the wing structure may be a deployment of the first control surface.

Next, responsive to rotation of the arm in the first direction, a second link that is coupled to the arm and a second control surface may be moved to thereby move the second control surface in coordination with the first control surface (operation 1504), with process 1500 terminating thereafter. At operation 1504, the second control surface moves in coordination with the first control surface to provide a desired combined surface profile for the outer surfaces of these two control surfaces during deployment of the first control surface. The second control surface may be, for example, droop panel 204.

In process 1500, the arm, the first link, and the second link may form a bell-crank system such as bell-crank system 200 described in FIGS. 2-10. The lengths of the arm, the first link, and the second link, as well as the joints used to couples these components together are selected to provide the desired kinematics needed for moving the second control surface in coordination with the first control surface.

Figure 16:
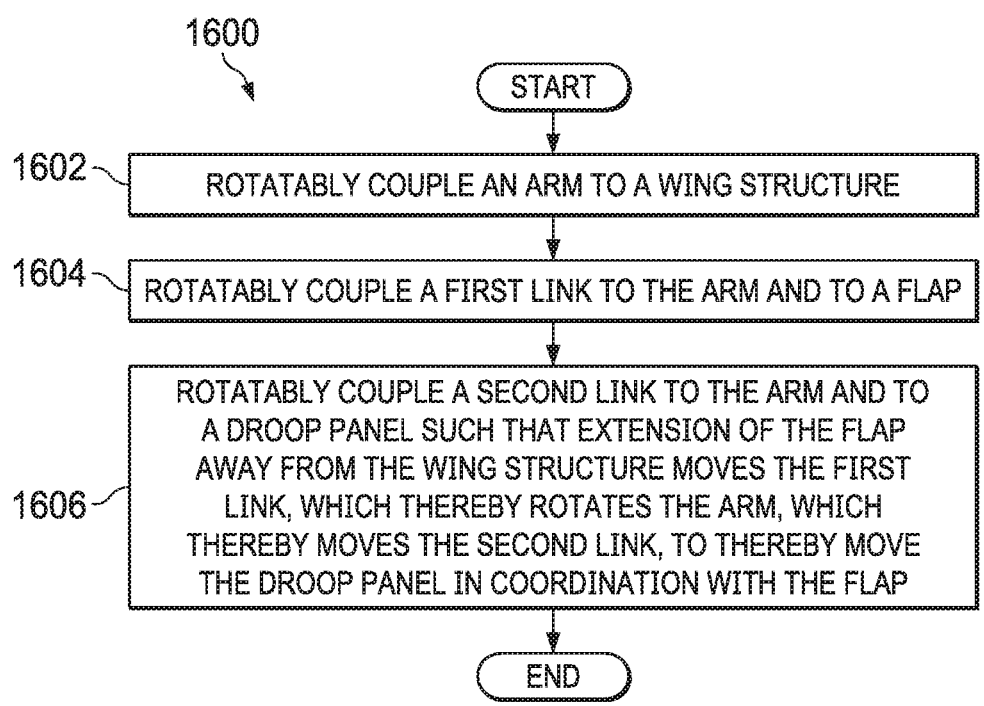
FIG. 16 is a flowchart of a process for coupling a bell-crank system to a flap and a droop panel in accordance with an example embodiment.

With reference now to FIG. 16, a flowchart of a process for coupling a bell-crank system to a flap and a droop panel is depicted in accordance with an example embodiment. Process 1600 illustrated in FIG. 16 may be employed to couple a coupling and positioning system to a flap and a droop panel. For example, process 1600 may be used to couple or otherwise connect bell-crank system 200 described in FIGS. 2-14 to flap 202 and droop panel 204.

Process 1600 may begin by rotatably coupling arm 208 to wing structure 206 (operation 1602). First link 210 is then rotatably coupled to arm 208 and to flap 202 (operation 1604). First link 210 may also be referred to as a flap link. Second link 212 is rotatably coupled to arm 208 and to droop panel 204 such that extension of flap 202 away from wing structure 206 moves first link 210, which thereby rotates arm 208, which thereby moves second link 212 to thereby move droop panel 204 in coordination with flap 202 (operation 1606), with process 1600 terminating thereafter. Second link 212 may also be referred to as a droop link.

Figure 17:
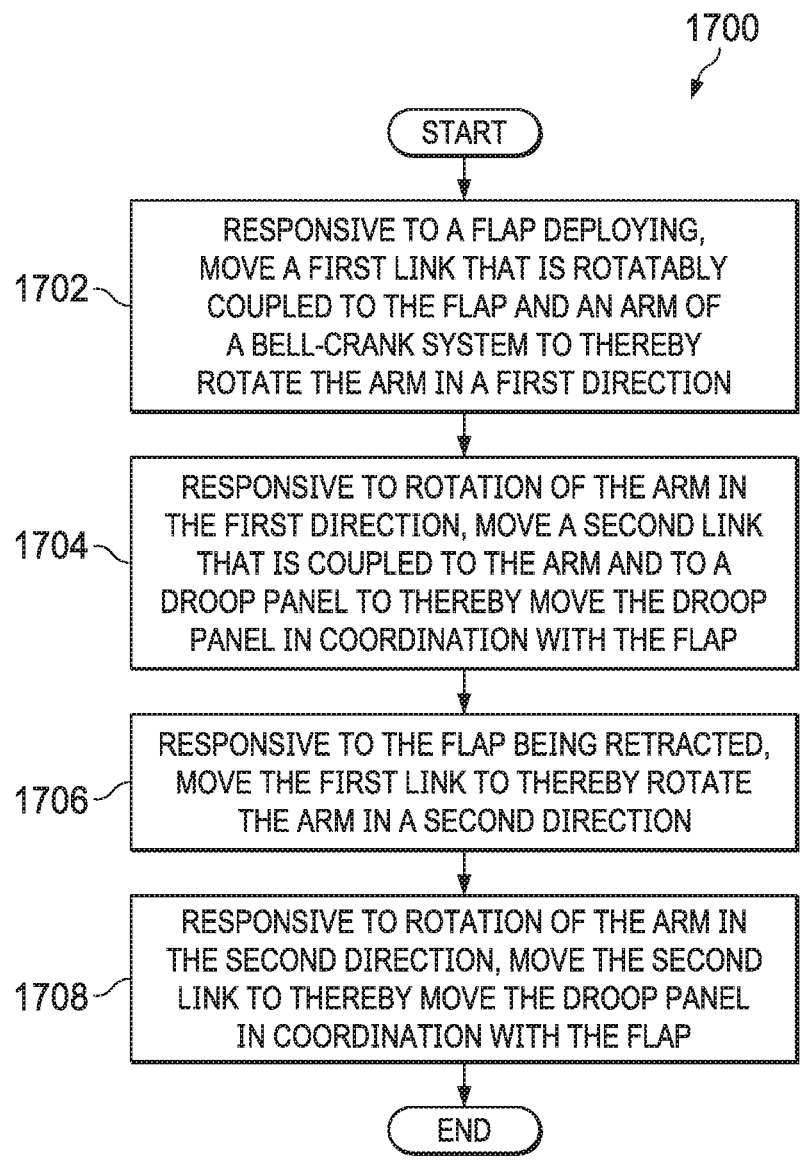
FIG. 17 is a flowchart of a process for controlling a droop panel in accordance with an example embodiment.

With reference now to FIG. 17, a flowchart of a process for controlling a droop panel is depicted in accordance with an example embodiment. Process 1700 illustrated in FIG. 17 may be implemented using a coupling and positioning system. For example, process 1700 may be implemented using bell-crank system 200 described in FIGS. 2-14.

Process 1700 may begin by, responsive to flap 202 deploying, moving first link 210 that is rotatably coupled to flap 202 and to arm 208 of bell-crank system 200 to thereby rotate arm 208 in a first direction (operation 1702). In other words, the deployment of flap 202 (e.g., the movement of flap 202 away from wing structure 206) may cause first link 210 to move, which in turn, causes arm 208 to rotate. In these illustrative examples, flap 202 is deployed from the stowed position into a deployed position. In other illustrative examples, flap 202 is deployed from a partially deployed position into a more or fully deployed position.

Next, responsive to rotation of arm 208 in the first direction, second link 212 that is coupled to arm 208 and droop panel 204 is moved to thereby move droop panel 204 in coordination with flap 202 (operation 1704). At operation 1704, moving droop panel 204 in coordination with flap 202 provides a desired combined surface profile for flap 202 and droop panel 204 as flap 202 is deployed. This desired combined surface profile may be maintained the whole time through the movement of flap 202 into a selected deployed position and after flap 202 has been moved into the selected deployed position. The selected deployed position may be a partially or fully deployed position.

Thereafter, responsive to flap 202 being retracted, first link 210 is moved to thereby rotate arm 208 in a second direction (operation 1706). The second direction may be opposite to the first direction described in operation 1702 above. Flap 202 may be retracted from the fully deployed position or a partially deployed position. In these illustrative examples, flap 202 is retracted from a deployed position back into the stowed position. In some illustrative examples, flap 202 may be retracted from one deployed position to another, less deployed position or into the stowed position.

Responsive to rotation of arm 208 in the second direction, second link 212 is then moved to thereby move droop panel 204 in coordination with flap 202 (operation 1708), with process 1700 terminating thereafter. At operation 1708, moving droop panel 204 in coordination with flap 202 provides the desired combined surface profile for flap 202 and droop panel 204, as flap 202 is retracted. The desired combined surface profile formed by flap 202 and droop panel 204 may be maintained the whole time through the retraction of flap 202 into either another deployed position or the stowed position. Thus, bell-crank system 200 ensures that droop panel 204 moves in coordination with flap 202 during both the deployment and stowing of flap 202.

Thus, the example embodiments provide methods and apparatuses for controlling the position of a droop panel relative to a flap of a wing of an aircraft during extension of the flap. For example, bell-crank system 200 from FIG. 2 may be used to ensure that droop panel 204 moves in coordination with flap 202 such that a desired combined surface profile is maintained for flap 202 and droop panel 204 throughout extension of flap 202. Further, bell-crank system 200 may be positioned substantially horizontally relative to flap 202, wing structure 206, and the wing with which wing structure 206 is associated.

This horizontal or near-horizontal positioning of bell-crank system 200 and the "folding" mechanism employed by bell-crank system 200 may allow bell-crank system 200 to be used with wings that have a reduced height profile. In other words, the horizontal positioning of bell-crank system 200 may allow bell-crank system 200 to be used with a thinner wing, thereby providing improved aerodynamic performance of the aircraft, especially during high-speed flight conditions, such as, for example, cruising.

In these illustrative examples, bell-crank system 200 may "fold" and "unfold" substantially along a plane. This plane may be configured for the optimal movement of droop panel 204 relative to flap 202 based on at least one of integration, loading, or flap motion.

Further, bell-crank system 200 and the folding mechanism employed by bell-crank system 200 also enable a large reduction in motion from flap 202 to droop panel 204. In other words, using bell-crank system 200 reduces the motion of droop panel 204 needed for droop panel 204 to move in coordination with flap 202 to provide the desired combined surface profile, even with large angular displacements of flap 202. A large angular displacement of flap 202, as well as a large fowler motion (e.g., aftward translation,) may improve aerodynamic performance of the aircraft, especially during low-speed flight conditions, such as takeoff and landing.

The flowcharts and block diagrams in the different depicted embodiments illustrate the architecture, functionality, and operation of some possible implementations of apparatuses and methods in an example embodiment. In this regard, each block in the flowcharts or block diagrams may represent a module, a segment, a function, and/or a portion of an operation or step. In some alternative implementations of an example embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Further, other blocks may be added in addition to the illustrated blocks in a flowchart or block diagram.

The description of the different example embodiments has been presented for purposes of illustration and description, and is not intended to be exhaustive or limited to the embodiments in the form disclosed. Many modifications and variations will be apparent to those of ordinary skill in the art. Further, different example embodiments may provide different features as compared to other desirable embodiments. The embodiment or embodiments selected are chosen and described to best explain the principles of the embodiments and the practical application, and to enable others of ordinary skill in the art to understand the disclosure for various embodiments with various modifications as are suited to the particular use contemplated.

The invention claimed is:

1. An apparatus comprising:
an arm having a first end, a second end, and a body that extends between the first end of the arm and the second end of the arm, the first end of the arm rotatably coupled to a wing structure to define a first pivot point;
a first link having a first end and a second end, the first end of the first link being rotatably coupled to the second end of the arm; and
a second link having a first end and a second end, the first end of the second link rotatably coupled to the first end of the arm at the first end of the arm,
wherein, when the second end of the first link is rotatably coupled to a first control surface and the second end of the second link is rotatably coupled to a second control surface, movement of the first control surface away from the wing structure rotates the arm in a first direction about the first pivot point such that a motion of the second end of the arm and the first end of the first link includes a displacement along a spanwise direction of the wing structure, and such that the second control surface moves in coordination with the first control surface.

2. The apparatus of claim 1, wherein the first control surface is a flap, the second control surface is a droop panel, and the droop panel is moved in coordination with the flap to control a gap between an outer surface of the droop panel and an outer surface of the flap.

3. The apparatus of claim 1, wherein the first end of the first link is rotatably coupled to the second end of the arm to define a second pivot point and the first end of the second link is rotatably coupled to the first end of the arm to define a third pivot point.

4. The apparatus of claim 1, further comprising:
a first joint that rotatably couples the first end of the second link to the first end of the arm; and
a second joint that rotatably couples the first end of the first link to second end of the arm;
a third joint that rotatably couples the second end of the second link to the second control surface; and
a fourth joint that rotatably couples the second end of the first link to the first control surface, wherein the first joint, the second joint, the third joint, and the fourth joint have at least two degrees of rotational freedom.

5. The apparatus of claim 1, further comprising:
a fitting coupled to the wing structure and to the second control surface.

6. The apparatus of claim 5, wherein the first end of the arm is rotatably coupled to the fitting, thereby coupling the arm to the wing structure and the first control surface to the wing structure.

7. The apparatus of claim 1, wherein the first control surface is a flap and the second control surface is a droop panel, and wherein extension of the flap causes rotation of the arm and movement of the droop panel in coordination with the flap to control a combined surface profile formed by an outer surface of the flap and an outer surface of the droop panel during extension of the flap.

8. The apparatus of claim 1, further comprising:
the wing structure, wherein the wing structure is selected from one of a beam and a stabilizer.

9. The apparatus of claim 1, wherein the arm, the second link, and the first link form a bell-crank system.

10. The apparatus of claim 1, wherein the movement of the first control surface away from the wing structure moves the first link, which thereby rotates the arm, which thereby moves the second link, to thereby move the second control surface in coordination with the first control surface.

11. The apparatus of claim 1, wherein the first link has a first length, the second link has a second length, and the arm has a third length selected using kinematics based on the movement of the first control surface to control moving the second control surface and to control a combined surface profile formed by an outer surface of the first control surface and an outer surface of the second control surface during extension of the first control surface.

12. An apparatus comprising:
an arm having a first end, a second end, and a body that extends between the first end of the arm and the second end of the arm, the first end of the arm rotatably coupled to a wing structure to define a first pivot point;
a first link having a first end and a second end, the first end of the first link being rotatably coupled to the second end of the arm; and
a second link having a first end and a second end, the first end of the second link rotatably coupled to the first end of the arm at the first end of the arm,
wherein, when the second end of the first link is rotatably coupled to a flap and the second end of the second link is rotatably coupled to a droop panel, movement of the flap away from the wing structure rotates the arm in a first direction about the first pivot point such that a motion of the second end of the arm and the first end of the first link includes a displacement along a spanwise direction of the wing structure, and such that the droop panel moves in coordination with the flap to control a combined surface profile formed by an outer surface of the flap and an outer surface of the droop panel during extension of the flap.

13. The apparatus of claim 12, further comprising:
the wing structure, wherein the wing structure is selected from one of a beam and a stabilizer.

14. The apparatus of claim 13, further comprising:
a first joint that rotatably couples the first end of the second link to the first end of the arm; and
a second joint that rotatably couples the first end of the first link to the second end of the arm.

15. The apparatus of claim 14, further comprising:
a third joint that rotatably couples the second end of the second link to the droop panel; and
a fourth joint that rotatably couples the second end of the first link to the flap, wherein the first joint, the second joint, the third joint, and the fourth joint have at least two degrees of rotational freedom.

16. The apparatus of claim 12, wherein the arm, the first link, and the second link form a bell-crank system that is positioned substantially horizontally relative to the flap.

17. The apparatus of claim 16, wherein the bell-crank system being positioned substantially horizontally relative to the flap allows the bell-crank system to be used with a wing having a reduced height profile.

18. A method comprising:
responsive to movement of a first control surface away from a wing structure, moving a first link that is rotatably coupled to the first control surface and an arm to thereby rotate the arm in a first direction, the arm having a first end, a second end, and a body that extends between the first end of the arm and the second end of the arm,
wherein rotating the arm in the first direction causes a motion of the second end of the arm and an end of the first link that includes a displacement along a spanwise direction of the wing structure; and
responsive to rotation of the arm in the first direction, moving a second link that is coupled to the first end of the arm at the first end of the arm and a second control surface to thereby move the second control surface in coordination with the first control surface.

19. The method of claim 18, wherein the first control surface is a flap and the second control surface is a droop panel.

20. The method of claim 19, wherein the droop panel is moved in coordination with the flap to control a gap between an outer surface of the droop panel and an outer surface of the flap during extension of the flap.

* * * * *